3,410,659
PURIFICATION AND STABILIZATION OF
HYDROGEN PEROXIDE
Carl K. Muehlhausser, Charleston, W. Va., assignor to
FMC Corporation, New York, N.Y., a corporation of
Delaware
No Drawing. Filed May 5, 1965, Ser. No. 453,482
7 Claims. (Cl. 23—207.5)

ABSTRACT OF THE DISCLOSURE

Aqueous hydrogen peroxide having a concentration of about 15–80% is purified by treatment with non-alkaline, activated alumina to render it particularly susceptible to stabilization with added stabilizers.

---

This invention relates to the purification of hydrogen peroxide, and particularly to the purification of aqueous hydrogen peroxide to provide an aqueous hydrogen peroxide solution in which stabilizers against peroxide decomposition are particularly effective.

Hydrogen peroxide is produced by several methods, for example by the alternate oxidation and reduction of substituted anthraquinones, electrolysis of ammonium sulfate to produce ammonium persulfate and hydrolysis of this to provide hydrogen peroxide, oxidation of isopropyl alcohol, and the like.

The products of these processes vary somewhat in their makeup; however, they share a common characteristic. They all contain metallic ion impurities in varying amounts, and therefore are subject to decomposition by these impurities. This susceptibility to decomposition is particularly aggravated when the hydrogen peroxide is subjected to an elevated temperature, or when it is permitted to come into contact with additional impurities of a metallic or organic nature.

In an attempt to overcome the problems presented by the impurities inherently present in hydrogen peroxide as it is produced commercially, a variety of stabilizers have been developed, which minimize the tendency of the hydrogen peroxide to decompose. Typical stabilizing systems include combinations of additives such as dipicolinic acid and sodium pyrophosphate, sodium pyrophosphate and sodium stannate, ethylene diamine tetraacetic acid and sodium stannate, nitrilo trimethylene phosphonic acid and sodium stannate, nitrilo triacetic acid and sodium stannate, and the like.

These stabilizers generally are very effective in minimizing decomposition. However, they can only be as effective as the impurities in the hydrogen peroxide solution product permit. That is, hydrogen peroxide in an aqueous solution containing substantial amounts of metallic impurities tends to be unstable to a small but important extent, particularly at elevated temperatures, despite the presence of the most effective stabilizers.

It therefore has remained desirable, and it is an object of my invention, to provide a means for producing a pure aqueous hydrogen peroxide which is fundamentally stable in itself, and which therefore is susceptible to being rendered essentially completely stable by the addition of known stabilizing systems.

I have now found that it is possible to provide an aqueous hydrogen peroxide which is capable of being rendered essentially completely stable by addition of known stabilizers, by contacting an aqueous hydrogen peroxide solution containing decomposition-inducing impurities and having a concentration of about 15 to 80% by weight of hydrogen peroxide, for at least about 1 minute, and preferably for about 1–5 minutes, with activated alumina having a particle size of about 6 to 100 mesh, and preferably about 8 to 14 mesh, the activated alumina being at an essentially neutral pH such that upon being washed with 10 times its weight of water over a one minute period it leaves the wash water at a pH no higher than about 8.

Activated alumina having the indicated particle sizes and pH characteristics is quite specific in its effectiveness in the process of my invention. Substitution of a closely related absorbent, silica gel, does not provide anywhere near the degree of purification of 15 to 80% hydrogen peroxide solutions which is provided with activated alumina. The effectiveness of the activated alumina treatment of my invention is evidenced by the stability of the hydrogen peroxide produced in accordance with the process, and stabilized with the usual stabilizers, as compared with the corresponding lower stability of a sample of hydrogen peroxide from the same source stabilized with the same stabilizers, but not purified by the process of my invention.

The hydrogen peroxide treated by my proces can be that manufactured by any means, for example electrolytically from ammonium sulfate, by an organic process such as the alternate oxidation and reduction of substituted anthraquinones, oxidation of isopropyl alcohol, hydrolysis of peracetic acid or the like. The hydrogen peroxide prepared by these methods can be concentrated readily, for example by distillation methods such as those of U.S. Patents 2,684,889 to Crewson et al., issued July 27, 1954 and 3,152,052 to T. M. Jenny et al., issued Oct. 6, 1964, by freezing rectification as described in U.S. Patent 2,724,640 to Crewson et al., issued Nov. 22, 1955, or by other known methods.

Hydrogen peroxide as it is produced commercially is surprisingly free of impurities. However, even those small amounts of impurities which are present in it and which are derived either from the raw materials fed to the process, from process equipment or from the atmosphere, are sufficient to cause instability of the hydrogen peroxide under certain adverse conditions such as exposure to elevated temperatures or the like. Impurities encountered in the manufacturing process ordinarily are metallic ions such as copper, manganese, chromium, iron and the like ions, as well as other decomposition inducing contaminants such as organic matter. The metallic ions are particularly offensive.

My process treats aqueous hydrogen peroxide having a concentration by weight from on the order of 15–20% up to 80%, or even higher, of hydrogen peroxide. The treatment may be applied to hydrogen peroxide at an intermediate stage in manufacture, for example prior to concentration by distillation or other means, or following completion of its manufacture and concentration. It is preferred to treat the hydrogen peroxide after all manufacturing operations have been completed, in order to take care of any impurities which might be introduced at any of the manufacturing stages.

The herein purification treatment is carried out by intimately contacting the hydrogen peroxide for a period of one minute or more, and preferably 1–5 minutes, with an activated alumina having a particle size of about 6–100, and preferably 8–14, mesh and free of water-leachable alkaline matter.

The amount of alumina required for a given amount of hydrogen peroxide varies relative to the contact time. At least one minute of contact should be provided and for best operation at one minute to five minutes the weight ratio of alumina to aqueous hydrogen peroxide solution should be within the range of about 1:2 to 3:1. Increasing the contact time makes it possible to operate with less than 1 part by weight of alumina for 2 parts by weight of hydrogen peroxide solution, however, it is preferred to operate within the given range of 1:2 to 3:1 by weight of alumina to hydrogen peroxide solution. The relative amounts also are affected by the manner of operation, e.g., whether the treatment is carried out in a columnar vessel or, for example, with agitation in a pot-type vessel.

The temperature at which my purification process is carried out is not critical, but it is best carried out at ambient temperatures. Operation at ambient temperatures is best both for ease of operation and because operation at elevated temperatures in the presence of impurities not yet removed from the hydrogen peroxide, or of those adsorbed onto the activated alumina, is apt to cause decomposition of the hydrogen peroxide even in the short times the hydrogen peroxide is in contact with the impurities. Indeed, observing temperature is an effective way to determine decomposition of hydrogen peroxide in the system, a temperature rise of 2–3° C. signaling the possible advent of serious decomposition.

It is important that the activated alumina be removed from the purification system after it has been employed to stabilize sufficient hydrogen peroxide so that impurities picked up by the alumina are present in an amount to cause decomposition of hydrogen peroxide contacted with it. This will vary with the amount of impurities present in the hydrogen peroxide, but generally speaking, I have found it possible to treat 1,000 to 5,000 pounds or even more of hydrogen peroxide (calculated as 100%) with a pound of alumina. The removed activated alumina can be regenerated readily by acid washing, burning and the like to remove adsorbed impurities. The aluminas having large surface areas and obtained from various hydrated forms by controlled heating, for example on the order of 400° C., so as to eliminate most of the water of constitution, are known under the name of "activated aluminas."

The treatment is very effectively carried out in a column, in which the alumina particles are supported on inert packing or support such as glass wool or the like. The hydrogen peroxide is passed through the column in close contact with the alumina at controlled rates and for controlled times.

Use of a column also has the advantage that it is possible to introduce the activated alumina into the column even in a dirty condition, that is containing substantial alkaline and other impurities, and to wash these impurities from the alumina in place in the column before the hydrogen peroxide treatment. The wash of the activated alumina of course can be carried out in any apparatus; it is necessary to wash only where the activated alumina is such to raise the pH of the wash water, employed in the amount of 10 times the alumina weight, over a one minute period to above about pH 8. Normally purified water, e.g. deionized, distilled or otherwise treated for removal of impurities, will be used herein.

The wash suitably is carried out with water, or, preferably, with an inert inorganic acid such as phosphoric acid or nitric acid. When the acid is used to wash the alumina it normally is washed from it with water, although in some cases, particularly where phosphoric acid is employed to wash the alumina, some of the acid may be permitted to remain on the alumina. The activated alumina is washed until it imparts to wash water a pH not higher than about 8, although it can be left at essentially any level below 8 following the wash, since hydrogen peroxide itself is most stable in quite acid solution provided a compatible washing acid is used.

The hydrogen peroxide purified by our process is stabilized with the usual stabilizing additives. Effective stabilizers frequently comprise a tin compound, e.g. sodium stannate, normally used as the trihydrate, together with an additive such as ethylene diamine tetraacetic acid, nitrilo triacetic acid, dipicolinic acid, nitrilo trimethylene phosphonic acid, phosphoric acid or the like. The tin compound is employed to stabilize the hydrogen peroxide, while the other additive sequesters impurities which are present in the hydrogen peroxide or might be introduced into it during storage or use.

A further additive which is often used in stabilized hydrogen peroxide solutions is sodium nitrate, an ingredient which minimizes corrosion of metals contacted by the hydrogen peroxide. These stabilizers are added to the hydrogen peroxide by various means, it being possible simply to stir them into the aqueous hydrogen peroxide or to predissolve them to form a concentrated stabilizer solution which then can be added to the hydrogen peroxide to be stabilized.

The following examples are presented by way of illustration of my invention, and are not intended by way of limitation thereof. All percentages are given by weight of the total composition. Stabilities of the hydrogen peroxide solutions were determined by storing them for 24 hours at 100° C. in an open vial and determining the percentage of the hydrogen peroxide remaining after this period. This percentage is given as the stability value. pH's were measured on a Beckman pH meter employing a glass electrode, and the readings reported as pH.

EXAMPLES 1 TO 7

Five and one-half inch high glass columns having one-inch inside diameters, were each loaded with 90 g. of activated alumina having a particle size of 8–14 mesh (except for Example 7 which used activated alumina balls of 6–8 mesh size), supported on glass wool. The void space in each of the loaded columns was 42 ml., and this represented the amount of liquid the column would hold. Each alumina loading was washed in place in the column, with nitric acid, phosphoric acid or water as indicated in Table 1 which follows to neutralize or remove alkaline substances present in the alumina and susceptible to leaching. The acid washed alumina was rinsed with deionized water to remove residual acids, while the water washed sample was washed until the wash water removed from the column had a pH of 8.

Aqueous hydrogen peroxide solutions containing about 73% by weight of hydrogen peroxide were passed through the preconditioned columns at a rate to provide the contact times given in Table 1. This hydrogen peroxide has been produced by the alternate oxidation and reduction of 2-ethylanthraquinone, and contained the usual copper, chromium, manganese, iron and organic impurities normally present in hydrogen peroxide so produced. The effluent from each column was filtered through acid washed diatomaceous earth to remove any entrained particles. The solutions were then stabilized with 85 p.p.m. of dipicolinic acid and 210 p.p.m. of sodium pyrophosphate, and the pH's of the solutions were adjusted with 85% phosphoric acid to 0.2 to 0.4 as measured with a glass electrode.

As shown in Table 1, 24-hour stability tests at 100° C. showed that the hydrogen peroxide solutions treated with activated alumina according to my invention were much more stable than solutions similar in other respects, but not treated with activated alumina.

Aqueous hydrogen peroxide solutions containing 68.1–72.5% of hydrogen peroxide as noted in Table 3 below were continuously passed through the columns and filtered through acid washed diatomaceous earth. The solutions were stabilized with dipicolinic acid and sodium

TABLE 1

| Example: | Activated Alumina Particle Size U.S. Standard Mesh | Alumina Wash | Hydrogen Peroxide Concentration, percent | Volume, gals. | Contact Time, mins. | Hydrogen Peroxide Stabilities [1] | |
|---|---|---|---|---|---|---|---|
| | | | | | | Untreated | Treated w/Alumina |
| 1 | 8–14 | 5% Aqueous Nitric Acid | 73.0 | 1 | 1 | 82.0 | 99.0 |
| 2 | 8–14 | ---do--- | 72.8 | 1 | 1 | 82.0 | 99.0 |
| 3 | 8–14 | ---do--- | 73.0 | 1 | 5 | 82.0 | 99.0 |
| 4 | 8–14 | 5% Aqueous Phosphoric Acid | 72.8 | 1 | 1 | 82.0 | 98.0 |
| 5 | 8–14 | ---do--- | 72.8 | 1 | 1 | 61.0 | 98.5 |
| 6 | 8–14 | Water (Deionized) | 72.5 | 1 | 1 | 82.0 | 99.0 |
| 7 | 6–8 | ---do--- | 71.1 | 1 | 1 | <82 | 98.0 |

[1] Both contained the dipicolinic acid-solution pyrophosphate stabilizer referred to above. Values given are percentages retained after 24 hours at 100° C.

EXAMPLES 8 TO 11

Two and three-fourths inch high glass columns having inside diameters of one inch were each loaded with 40 g. of activated alumina having a particle size of 8–14, supported on glass wool. The void spaces in each column were 22 ml. The alumina was washed in place with water at a ratio of one part by weight of alumina to 2,000 parts by weight of water. The pH of the last wash water removed from the column was 8.0.

About 2 gallon portions of an aqueous hydrogen peroxide solution containing 17% by weight of hydrogen peroxide were passed through the columns at rates to provide the contact times given in Table 2 which follows. The hydrogen peroxide solution used was derived from the anthraquinone process, prior to concentration. Final one-liter portions of each run were passed through acid washed diatomaceous earth and collected. The solutions were stabilized with dipicolinic acid and sodium pyrophosphate as described in Examples 1 to 7 and the pH's of the solutions were adjusted to 2.0 to 2.4 with 85% phosphoric acid. The results shown in Table 2 demonstrate that a contact time of at least about 1 minute with activated alumina is required to provide optimum stabilization of hydrogen peroxide.

pyrophosphate as described in Examples 1–7, and the pH's of the hydrogen peroxide solutions were adjusted with 85% phosphoric acid to within the range 0.2 to 0.4.

These examples, the results of which are shown in Table 3 below, demonstrate the improvement in stability of hydrogen peroxide imparted by treating it prior to stabilization with activated alumina in accordance with my invention. Likewise, it demonstrates the economy of my process, it being shown that high efficiencies are still attained after a 25-gallon throughput. After this throughput, only the upper one-inch of the alumina layer was spent, as indicated by color appearance, that portion of the alumina having become yellowish.

TABLE 3

| Example: | Hydrogen Peroxide Concentration, percent | Alumina Wash | Volume, gals. | Contact Time, mins. | Hydrogen Peroxide Stabilities [1] | |
|---|---|---|---|---|---|---|
| | | | | | Untreated | Treated with Alumina |
| 12 | 68.1 | Water (Deionized) | 6 | 1.6 | 82.0 | 99.5 |
| 13 | 68.1 | ---do--- | 10 | 1.7 | 82.0 | 99.5 |
| 14 | 72.5 | ---do--- | 25 | 1.1 | 82.0 | 99.0 |

[1] Both contained the dipicolinic acid-sodium pyrophosphate stabilizer referred to above. Values given as percentages retained after 24 hours at 100° C.

EXAMPLE 15

Examples 1 to 14 employ the stabilizing system dipicolinic acid-sodium pyrophosphate in the aqueous hydrogen peroxide solution. Substitution of other stabilizers also results in a marked improvement in final stability of the treated hydrogen peroxide. Such other stabilizers are exemplified by the systems sodium stannate-nitrilo trimethylene phosphonic acid, sodium stannate-ethylene diamine tetraacetic acid, sodium stannate-nitrilo triacetic acid, sodium stannate-dipicolinic acid, sodium stannate-phosphoric acid and the like. When any of these or other

TABLE 2

| Example: | Alumina Wash | Hydrogen Peroxide Concentration, percent | Volume, gals. | Contact Time, mins. | Hydrogen Peroxide Stabilities [1] | |
|---|---|---|---|---|---|---|
| | | | | | Untreated | Treated with Alumina |
| 8 | Water (Deionized) | 17.0 | 2 | 0.2 | 86.0 | 89.0 |
| 9 | ---do--- | 17.0 | 2 | 0.5 | 79.0 | 89.0 |
| 10 | ---do--- | 17.0 | 2 | 1.0 | 79.0 | 98.0 |
| 11 | ---do--- | 17.0 | 2 | 2.2 | 86.0 | 99.0 |

[1] Both contained the dipicolinic acid-sodium pyrophosphate stabilizer referred to above. Values given as percentages retained after 24 hours at 100° C.

EXAMPLES 12 TO 14

Five-inch high glass columns having inside diameters of one inch were loaded with 80 g. of activated alumina having a particle size of 8–14, supported on glass wool. The void space in each column was 40 ml. Alkaline matter on the alumina was washed out by water washing until the wash water showed a pH of 8.

stabilizers are used in place of the dipicolinic acid-sodium pyrophosphate stabilizer system of the above examples, the advantage therein demonstrated for the alumina treated hydrogen peroxide solutions is observed.

Comparative Example A

In order to demonstrate the specificity of employing activated alumina in my treatment of hydrogen peroxide, an experiment was run employing silica gel in place of the activated alumina. A 73% by weight hydrogen peroxide solution from the batch employed in Example 1 was contacted in the manner described in Examples 1 to 6, but with 6-16 mesh silica gel particles, and for two minutes. The hydrogen peroxide was stabilized with dipicolinic acid and sodium pyrophosphate as in Examples 1 to 7 and the stability of the treated hydrogen peroxide was determined. In this case the stability of the hydrogen peroxide was only 88% as compared with the at least 98% stabilities shown in Examples 1 to 7 in Table 1 for hydrogen peroxide treated with activated alumina.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A method of stabilizing an aqueous hydrogen peroxide solution having a concentration of 15% to 80% of hydrogen peroxide and containing decomposition-inducing impurities, comprising contacting said aqueous hydrogen peroxide solution with activated alumina having a particle size of 6-100 mesh for at least one minute, said activated alumina being substantially non-alkaline such that upon being contacted with ten times its weight of water for one minute it imparts to the water a pH of not greater than 8, and then adding a stabilizing agent to said solution.

2. The method of claim 1 in which the activated alumina has a particle size of 8-14 mesh.

3. The method of claim 1 in which the aqueous hydrogen peroxide solution is contacted with the activated alumina for 1-5 minutes.

4. The method of claim 1 in which the activated alumina is washed with water before being contacted with the hydrogen peroxide.

5. The method of claim 1 in which the activated alumina is washed with phosphoric acid and then with water before being contacted with the hydrogen peroxide.

6. The method of claim 1 in which the activated alumina is washed with nitric acid and then with water before being contacted with the hydrogen peroxide.

7. A method of stabilizing an aqueous hydrogen peroxide solution having a concentration of 15% to 80% of hydrogen peroxide and containing decomposition-inducing impurities comprising contacting said aqueous hydrogen peroxide solution with activated alumina having a particle size of 6-100 mesh for at least one minute, said activated alumina being substantially non-alkaline such that upon being contacted with ten times its weight of water for one minute it imparts to the water a pH of not greater than 8, concentrating the aqueous hydrogen peroxide solution which has been contacted with said activated alumina, and then adding a stabilizing agent to said solution.

References Cited

UNITED STATES PATENTS

| 1,275,765 | 8/1918 | Schaidhauf | 23—207.5 |
| 2,739,875 | 3/1956 | Sprauer et al. | 23—207 |

FOREIGN PATENTS

| 591,796 | 2/1960 | Canada. |

EDWARD J. MEROS, *Primary Examiner.*

H. S. MILLER, *Assistant Examiner.*